United States Patent Office 2,933,473
Patented Apr. 19, 1960

2,933,473

MERCAPTANS AS CATALYSTS FOR POLYMERIZATION OF ETHOXYLINE RESINS

John V. Schmitz, Fullerton, Calif., assignor to General Electric Company, a corporation of New York No Drawing. Application July 9, 1956
Serial No. 596,429

12 Claims. (Cl. 260—47)

This invention relates to the polymerization of ethoxyline (epoxy) resins and to the polymers so produced. More particularly it relates to catalyzed polymerization of ethoxyline resins.

Ethoxyline or epoxy resins which are the reaction products of polyphenolic compounds, such as bisphenol A (p,p' isopropylidine bisphenol or p,p'-dihydroxydiphenyl dimethyl methane), and an epoxy compound, such as epichlorhydrin, range in character from liquids to high melting solids. These resinous reaction products when suitably cured exhibit properties which make them highly desirable for many uses. Hardening agents are employed to accelerate or promote the curing. Both acids and amines are effective hardening agents for these resins and a wide variety of both types have been used.

The time and temperature required to produce a given degree of cure in a particular ethoxyline resin varies with different hardening agents and variation in the properties of the hardened resins also results from changes in the hardening agent employed and from changes in the time or temperature of polymerization. Despite these variations the known hardening agents require relatively high temperatures or relatively long times or both to provide a complete cure and the cured resins obtainable are lacking in certain desired properties.

It is an object of this invention to provide an improved method of hardening or curing ethoxyline resins involving the use of novel accelerators for the hardening or curing of these resins.

A further object is to provide an improved method of hardening or curing ethoxyline resins involving the use of novel accelerators for the amine-catalyzed curing or hardening of these resins.

Still another object is to provide new and improved cured or hardened ethoxyline resins having new and improved properties.

Other objects will appear hereinafter.

It has now been found that the foregoing objects are accomplished by curing or hardening ethoxyline resins in the presence of amines together with certain mercaptans. The effective mercaptans are those which react exothermically with amines to form compounds or complexes. These mercaptans greatly accelerate the curing or hardening of ethoxyline resins in the presence of amines even at room temperature. Furthermore, the curing of the ethoxyline resins in accordance with this invention may be carried out with the ethoxyline resins alone or in the presence of other resins, such as phenolic resins, melamine- or urea-formaldehyde resins and the like or in the presence of compounding ingredients, such as fillers and the like.

Ethoxyline resins to which the present invention is applicable are glycidyl polyethers of dihydric phenols having a 1,2-epoxy equivalency greater than 1.0, i.e., having more than one

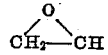

group in the average molecule of the glycidyl polyether and preferably not more than 2. Since the glycidyl polyethers of dihydric phenols are usually mixtures of polymers of varying molecular weights, the measured molecular weight upon which epoxy equivalency is determined is the average molecular weight. For example, glycidyl compounds to which this invention is applicable can be prepared by reacting 2,2 bis (4-hydroxyphenyl) propane with epichlorohydrin in alkaline solution with varying mole ratios of epichlorohydrin to dihydric phenol. By decreasing the mole ratio of epichlorohydrin to dihydric phenol from 2 to 1, the average molecular weight is increased.

Examples of dihydric phenols that can be reacted with epichlorohydrin in alkaline solution to yield the glycidyl ethers are mononuclear phenols, such as resorcinol, catechol, hydroquinone, etc., or polynuclear phenols such as 2,2 bis (4-hydroxyphenyl) propane, bisphenol, 44'-dihydroxybenzophenone, 1,1-bis (4-hydroxyphenyl) ethane, 1,1' bis (4-hydroxyphenyl) isobutane, 2,2-bis (4-hydroxyphenyl) butane, 2,2 bis (4-hydroxy-2-methylphenyl) propane, 2,2-bis (4-hydroxy-2-tertiarybutylphenyl) propane, bis (2-hydroxynaphthyl) methane, 1,5-dihydroxynaphthalene, etc. Although the product is a complex mixture, it may be represented by the following formula:

where R=a divalent hydrocarbon radical of a dihydric-phenol and n=a whole number. The value of n can be varied from 0 upwardly by changing the molecular proportion of epichlorohydrin and dihydric phenol. The preparation of these epoxy compounds is disclosed in U.S. Patent 2,615,008.

The mixture of the ethoxyline resin with the mercaptan and amine may be prepared in any desired way. Thus the mercaptan may be dissolved in or admixed with the uncured ethoxyline resin prior to, or at the same time as or after adding the amine or alternatively the mercaptan and amine may first be reacted and the resulting compound or complex may then be added to the uncured ethoxyline resin. Although a mixture of acidic mercaptan and ethoxyline resin hardens when heated to a temperature of the order of 60° to 100° C. in 6 to 10 hours it is relatively stable at room temperature since the polymerization reaction of the ethoxyline resin is very slow under these conditions. On the other hand the mixture of the ethoxyline resin and the amine-mercaptan complex or compound cures or hardens rapidly at room temperature.

Two factors appear to be of significance in determining the effectiveness of a mercaptan as an accelerator or curing agent. The first relates to the acidity of the mercaptan. Simple mercaptans are of no effect as accelerating agents, whereas more acidic mercaptans substantially accelerate the polymerization. Secondly, an increase in the number of acidic mercaptan groups in a compound improves the effectiveness of the compound as an accelerating or curing agent not merely in proportion to the increase in the number of mercapto groups but to an even greater extent.

Mercaptans which are more acidic and which give substantial acceleration are mercaptans such as thiophenol or esters of thioglycolic acid or mercaptosuccinic acid. Examples of mercaptans which structurally contain a number of acidic mercaptan groups and which are excellent as accelerating compounds are 2-ethylhexylthioglycolate, glycerol trithioglycolate and pentaerythritol tetrathioglycolate.

As a general rule, a compound's degree of acidity is determined by the ease with which it surrenders hydrogen so as to yield hydrogen ions. Stated another way, the degree of acidity is also a measure of the power of an acid to combine with a base. Thus, an acidic mercaptan may be defined as a mercaptan which easily surrenders hydrogen so as to form hydrogen ions and also one which very readily combines with bases. The hydrogen that causes this acidity of mercaptans is the hydrogen attached directly to sulfur (H—S—R).

Generally, those mercaptans which do not contain activating radicals are not sufficiently acid to be effective in this process. Examples of inactive mercaptans are alkyl mercaptans. However, such inactive mercaptans can be rendered sufficiently acidic by the substitution of negative radicals in the compound in close proximity to the mercapto group. Negative radicals comprise nitro, nitroso, nitrile, sulfone, sulfoxide, keto, aldehyde, carboxylic ester, aromatic such as phenyl, etc., polyhalogen, etc. radicals. Although halogen groups are not classified as typical negative groups, polyhalo groups exhibit negative or electron attracting properties. Carbon-containing negative groups, such as nitrile, keto, aldehyde, carboxylic ester, and aromatic groups are the preferred mercaptan activators.

The effect of negative groups on the mercaptan acidity is influenced by the proximity of the negative group to the mercaptan radical. In the practice of this invention in order to provide mercaptans which are sufficiently acid the negative group contained in the mercaptan compound should be bonded directly to the mercapto group or bonded to a carbon atom either α or β to the mercapto group, but preferably α. For example, the following are acidic mercaptans:

(1) 

(2) 

(3) 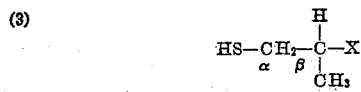

(4) 

(5) 

where X is a negative group. Assuming that X is a carboxylic ester group in (1) to (4) and aromatic in (5), the above compounds would be:

(1) 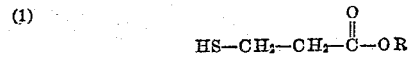

(2) 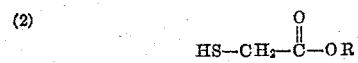

(3) 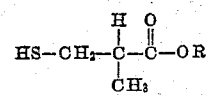

(4) 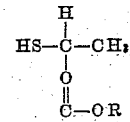

(5) 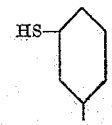

Thus, by an acidic mercaptan is meant a mercaptan-containing compound which contains at least one mercapto group activated by a negative group which negative group is attached directly to the mercapto group or to a carbon atom α or β to said mercapto group, but preferably α.

When the acidic mercaptan-amine complexes are formed by admixing the amine and the mercaptan, heat is evolved by the mixture and a colored product is produced. This product, which is probably a complex, can be used in its crude state or used after further purification. Although in practicing this invention the mole ratio of mercaptan to amine in the ethoxyline resin composition is not critical, it is preferable to have 1 mole equivalent of an acidic mercapto group, i.e., $$\frac{\text{molecular weight of mercaptan}}{\text{number of acidic mercaptan groups}}$$

to at least one mole equivalent of the amine, i.e., $$\frac{\text{molecular weight of amine}}{\text{number of amino groups}}$$

The use of excess amine (based on acid-base-equivalency) does not appear to interfere with cure acceleration. Excess mercaptan should not affect the accelerated cure, however. Any amine that will normally cure ethoxyline resins can be used although such polyamines as diethylene triamine, triethylene tetramine, tetraethylene pentamine, etc. are preferred.

The invention will be better understood by a consideration of the following examples which are intended as illustrations only, however, and are thus not intended to be construed as limitations.

The table below shows the results which were obtained by adding 1 mole-equivalent of various mercaptan compounds i.e., $$\frac{\text{molecular weight of mercaptan}}{\text{number of mercaptan groups}}$$

to 1 mole of diethylenetriamine designated "DET,"

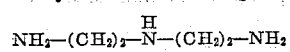

Thiophenol and dodecyl mercaptan are available commercially. The mercaptans employed in Examples 1, 3 and 4 were prepared by esterifying the respective corresponding alcohols with thioglycolic acid. Propylene glycol was esterified with mercaptosuccinic acid to provide the mercaptan used in Example 5.

TABLE 1

| Example No. | Mercaptan | Mercaptan/DET Mole Ratio | Exothermic Reaction | Color | Physical state on cooling |
|---|---|---|---|---|---|
| 1 | 2-ethylhexyl thioglycolate | 1:1 | Yes | Purple, then red | viscous. |
| 2 | dodecyl mercaptan | 1:1 | No | Purple | Two layers, upper purple, lower colorless. |
| 3 | glycerol trithioglycolate | 1:3 | Yes | Purple, then yellow brown. | viscous. |
| 4 | pentaerythritol tetrathioglycolate. | 1:4 | Yes | Brown | viscous and stiff. |
| 5 | propylene glycol mercapto succinate. | 1:1 | Yes | Purple, then brown | fairly hard. |
| 6 | thiophenol | 1:1 | Yes | Brown | solid salt. |

It is noted that the acidic mercaptans as shown in numbers 1 and 3 to 6 exhibit a strong exothermic reaction with diethylenetriamine while the comparatively non-acid dodecyl-mercaptan (No. 2) reacted but little, if at all, with the amine. Complexes of the amine and mercaptan were obtained in all examples except No. 2.

The table below presents results which were obtained using various mercaptans in combination with diethylenetriamine. The same ethoxyline monomer or uncured ethoxyline resin was used in each example. It is sold under the trademark "Epon 828." "Epon 828" has a melting point of 8° to 12° C., an epoxide equivalent or value (as hereinafter explained) of 190 to 210, an esterification equivalent of 80 and a hydroxyl equivalent of 1250. It is believed to be substantially equivalent to the epoxide represented in the formula previously given where R is the radical of bis-phenol A and $n=0$.

The same amount of diethylenetriamine, namely, 0.5 gram or 0.005 mole was also employed in each example. This was first mixed with a quantity of the particular mercaptan employed containing 0.005 mole of mercapto groups. Reaction between the amine and mercaptan in Examples 9 to 12, inclusive, took place on mixing the two but there was no apparent reaction in Example 8. The amine mercaptan complex so prepared (or in Example 8 the mixture so obtained) was then added to 4.5 grams of the ethoxyline monomer. The polymerizations were carried out at room temperature (28° C.). The mercaptan was omitted in Example 7 to provide a control.

transformed into a solid polymer which was hard at room temperature, but rubbery at 100° C. Another 10 gram portion of the Epon 828 containing neither amine nor mercaptan when similarly heated to a temperature of 100° C. for six hours did not polymerize.

Although the polymerized or cured ethoxyline resins prepared with the aid of amines and mercaptans as described in the above examples generally resemble the cured ethoxyline resins produced with the aid of previously known hardening agents, they are distinguished from these previously known cured ethoxyline resins by their heat distortion points and lower electrical losses. It is also possible to produce internally plasticized and less brittle ethoxyline resins by utilizing polymercaptans to aid in the curing or hardening of the ethoxyline resins. Various other desirable properties may be given to the cured ethoxyline resins by the choice of the particular mercaptan to be used in the curing of the ethoxyline resin with an amine. Thus, trithiocyanuric acid is effective in promoting the curing of ethoxyline resins in the presence of amines and provides resins which are resistant to deterioration by alkali.

As will be seen from the above examples, the mercaptans in combination with amines are effective at room temperature as well as at elevated temperature. Although heating is generally unnecessary when mercaptans and amines are employed in combination (as pointed out in the above examples, heat is evolved at room temperature raising the temperature of the reaction mixture), it is

TABLE 2

| Example No. | Mercaptan | Time to Become (Min.) | | | | Character of Cured Resin |
| --- | --- | --- | --- | --- | --- | --- |
| | | Light Taffy | Stiff Taffy | Soft Solid | Hard Solid | |
| 7 | None | 53 | 63 | 90 | 120 | Clear polymer. |
| 8 | Dodecyl mercaptan | 55 | 70 | 95 | 115 | Opaque polymer. |
| 9 | Thiophenol | 15 | 18 | 30 | 40 | Do. |
| 10 | 2-ethylhexylthioglycolate | 14 | 24 | 44 | 54 | Clear polymer. |
| 11 | Glycerol trithioglycolate | 10 | 15 | 20 | 30 | Opaque polymer. |
| 12 | Pentaerythritol tetrathioglycolate | 13 | 15 | 18 | 23 | Do. |

The order of activity appears to be as follows: (1) pentaerythritol tetrathioglycolate (4 SH groups), (2) glycerol trithioglycolate (3 SH groups), (3) thiophenol (1 SH group), (4) 2-ethylhexylthioglycolate (1 SH group) and (5) no mercaptan=dodecyl mercaptan. Thus the number of acidic mercaptan groups as well as acidity of the mercaptan appears to have an effect on the cure of ethoxyline resins.

As shown by Table 2 acidic mercaptan-amine complexes can be used as room temperature catalytic accelerators in ethoxyline resin curing or hardening. Alternately, the amine catalyst can be added to a solution of an effective mercaptan in the resin to bring about an accelerated curing or hardening of the latter.

*Example 13*

5 grams of propylene glycol mercaptosuccinate which contains 0.26 mole of mercapto groups was dissolved in 10 grams of the above described Epon 828 resin (the propylene glycol mercaptosuccinate had been previously prepared by reacting 0.525 mole of propylene glycol with 0.50 mole of mercaptosuccinic acid). To 4.5 grams of the solution of Epon 828 and propylene glycol mercaptosuccinate (0.008 mole of mercapto groups) there was added 0.5 gram of piperidine (0.006 mole). At room temperature the mixture evolved heat and polymerized or cured to a tough polymer within thirteen hours. A control sample containing only Epon 828 and the same amount of piperidine polymerized only to a light taffy during the same period. The propylene glycol mercaptosuccinate-Epon 828 solution increased in viscosity slowly at room temperature but after six hours at 100° C. was within the scope of the invention to harden the ethoxyline resins with the aid of amines and mercaptans in combination at elevated temperature, if desired.

The above illustrative examples show that the effects of the various mercaptans vary widely even when they are compared on the basis of equivalent moles of mercapto groups. Furthermore, the effect varies with different amines. The examples illustrate effective amounts of mercaptans and amines which may be used in combination in hardening ethoxyline resins. It will be observed that these amounts contain quantities of mercapto groups of the order of about 0.1 to about 0.3 mole of mercapto groups per 100 grams of ethoxyline resin. The invention is not intended to be limited to the use of these particular quantities, however, particularly in view of the difference in effectiveness of the various materials. Quantities of mercaptans in terms of moles of mercapto groups which are greater or less than the quantities employed in the above examples are within the scope of the invention. Similarly the quantities of amine may be varied or considering the mercaptan-amine complexes it is to be understood that the ratio of complex to resin as well as the ratio of amine to mercaptan in the complex may be varied within wide limits.

Since ethoxyline resins or monomers can be prepared in varying molecular weights, highly polymerized ethoxyline resin compositions which contain fewer epoxide groups will require less catalyst while the ethoxyline resin compositions of a lower degree of polymerization will require more catalyst. As a general rule, there should be at least one active hydrogen derived from the acidic mercaptan per epoxide group.

The 1,2 epoxide value of the ethoxyline resin compositions can be determined by heating a weighed sample of the ethoxyline resin with a measured volume of 0.2 N pyridinium chloride-chloroform solution at the boiling point under reflux for 2 hours. The pyridinium chloride which hydrochlorinates the epoxy groups to chlorohydrin groups is added in excess and on cooling, the excess pyridinium chloride is determined by back-titrating 0.1 N NaOH in methanol to the phenolphthalein end point. The epoxide value or equivalent is then readily calculated.

Ethoxyline resins cured according to the present invention may be used generally for the same purposes for which ethoxyline cured by previously known methods are useful. More particularly, the cured ethoxyline resins of this invention may be used as casting, impregnating, coating and adhesive compositions as well as for other purposes. Moreover, because of their improved properties, particularly higher heat distortion and lower electrical losses and in some cases resistance to alkali, the resins of this invention will have additional uses where these properties are of importance or will be found preferable.

By way of further specific example this process can be used to prepare epoxy-glass cloth laminates which can be used in printed circuits since the cured resins maintain excellent electrical properties under extremes of temperature. The reduced shrinkage which occurs during the curing of resins in accordance with this invention together with the excellent electrical properties and the inertness to petroleum derivatives of the cured resins makes the compositions of this invention particularly suitable for use as a base for potting compounds which can be poured cold. Because of the excellent adhesion of the cured resins produced as described herein, they can be used in conjunction with metals, glass and ceramics. They can also be used as surface coatings, either alone or with other compositions, such as linseed oil, phenolics, melamine or urea resins, or in baking enamels in combination with melamine and urea resins, and in fast curing prime coats on such things as beer cans, washing machines and other similar appliances. Other uses for these fast curing epoxy compositions will be apparent to those skilled in the art.

The exact mechanism of the reaction is not fully understood. Although both amines and acid mercaptans can individually accelerate the cure of ethoxyline resins, the rate of cure for each is comparatively slow. In view of this, it is difficult to explain why the combination should have such unexpected cure acceleration. In any event by the use of the amine-acidic mercaptan combination much time can be saved during the curing cycle in such commercial operations as molding, in such surface coating applications as industrial finishes, varnishes, enamels, prime coats for other finishes, etc., wire enamel applications, etc., thus reducing cost by increasing the output per unit of time.

The present invention has a number of advantages which will be apparent from the foregoing description. The use of mercaptans in combination with amines provides effective aceleration of the hardening of ethoxyline resins and permits it to be accomplished at room temperature in much less time than has been possible with previously known hardening agents. In addition, cured ethoxyline resins with novel and desirable properties are produced in accordance with tthis invention. By selection of one or another of the mercaptans as a hardening agent the properties of the cured resins may be further varied to adapt them for particular uses.

It is apparent that many widely different embodiments of this invention may be made without departing from the spirit and scope thereof and, therefore, it is not intended to be limited except as indicated in the appended claims.

I claim:
1. A method of curing glycidyl ethers of dihydric phenols which comprises catalyzing the polymerization of said ethers to the cured resinous state by means of a catalyst comprising the reaction product of an amine and a mercaptan selected from the group consisting of thiophenol, 2-ethylhexyl thioglycollate, glycerol trithioglycollate, pentaerythritol tetrathioglycollate, propylene glycol mercaptosuccinate, and mercaptans of the formula $HS-CH_2-X$ where X is a monovalent negative group selected from the class consisting of the nitrile and aldehyde groups.

2. A method of curing glycidyl ethers of dihydric phenols which comprises catalyzing the polymerization of said ethers to the cured resinous state by means of a catalyst comprising the reaction product of an amine and thiophenol.

3. A method of curing glycidyl ethers of dihydric phenols which comprises catalyzing the polymerization of said ethers to the cured resinous state by means of a catalyst comprising the reaction product of an amine and 2-ethylhexyl thioglycollate.

4. A method of curing glycidyl ethers of dihydric phenols which comprises catalyzing the polymerization of said ethers to the cured resinous state by means of a catalyst comprising the reaction product of an amine and glycerol trithioglycollate.

5. A method of curing glycidyl ethers of dihydric phenols which comprises catalyzing the polymerization of said ethers to the cured resinous state by means of a catalyst comprising the reaction product of an amine and pentaerythritol tetrathioglycollate.

6. A method of curing glycidyl ethers of dihydric phenols which comprises catalyzing the polymerization of said ethers to the cured resinous state by means of a catalyst comprising the reaction product of an amine and propylene glycol mercaptosuccinate.

7. A curable composition of matter comprising a glycidyl ether of a dihydric phenol and the reaction product of an amine and a mercaptan selected from the group consisting of thiophenol, 2-ethylhexyl thioglycollate, glycerol trithioglycollate, pentaerythritol tetrathioglycollate, propylene glycol mercaptosuccinate, and mercaptans of the formula $HS-CH_2-X$ where X is a monovalent negative group selected from the class consisting of nitrile and aldehyde groups.

8. A curable composition of matter comprising a glycidyl ether of a dihydric phenol and the reaction product of an amine and thiophenol.

9. A curable composition of matter comprising a glycidyl ether of a dihydric phenol and the reaction product of an amine and 2-ethylhexyl thioglycollate.

10. A curable composition of matter comprising a glycidyl ether of a dihydric phenol and the reaction product of an amine and glycerol trithioglycollate.

11. A curable composition of matter comprising a glycidyl ether of a dihydric phenol and the reaction product of an amine and pentaerythritol tetrathioglycollate.

12. A curable composition of matter comprising a glycidyl ether of a dihydric phenol and the reaction product of an amine and propylene glycol mercaptosuccinate.

References Cited in the file of this patent

UNITED STATES PATENTS

| | | |
|---|---|---|
| 2,789,958 | Fettes et al. | Apr. 23, 1957 |

FOREIGN PATENTS

| | | |
|---|---|---|
| 133,819 | Australia | Aug. 10, 1949 |
| 142,904 | Australia | Aug. 15, 1951 |

OTHER REFERENCES

Richter: Textbook of Organic Chemistry, 2d ed. 1943, J. Wiley & Sons Inc., N.Y., page 323.